United States Patent Office 2,937,426
Patented May 24, 1960

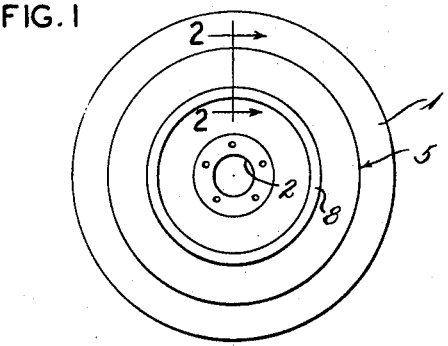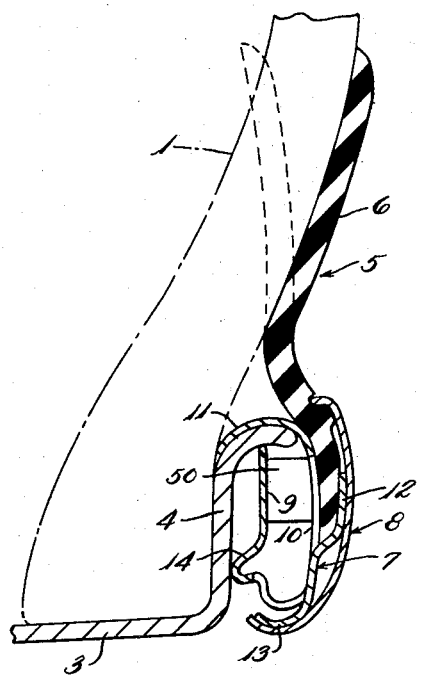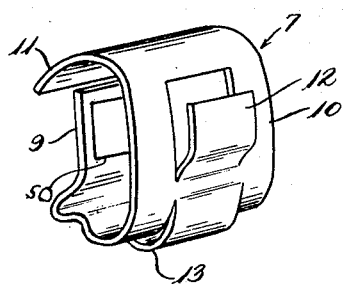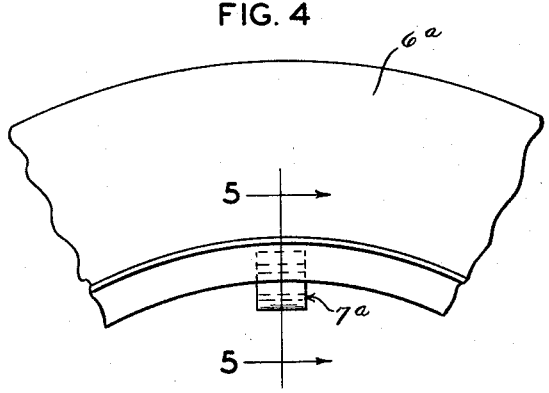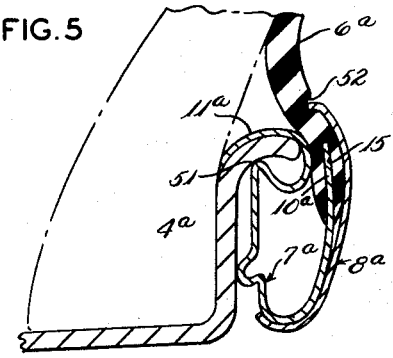
INVENTOR.
JAMES H. BARNES
ATTYS.

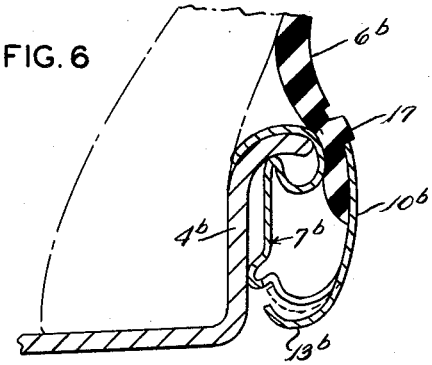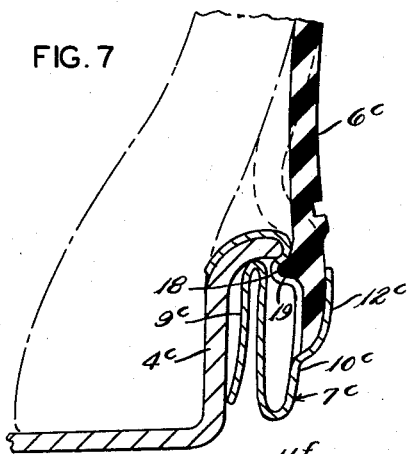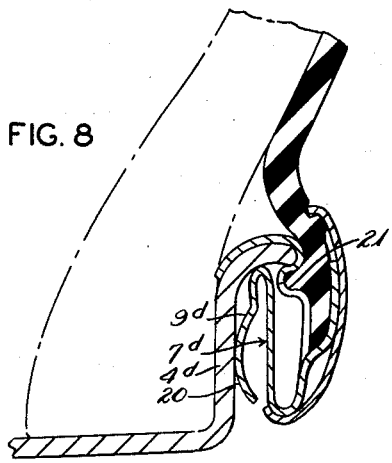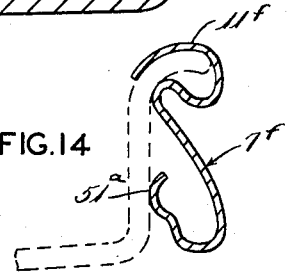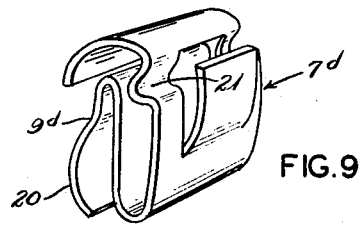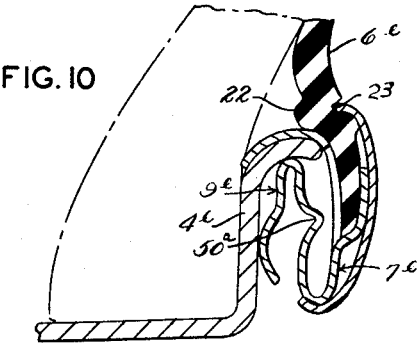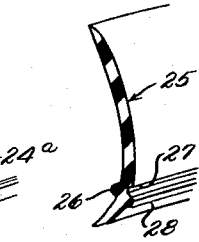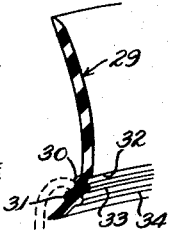

2,937,426

POSITIONING MEANS FOR A PNEUMATIC TIRE TRIM MEMBER ASSEMBLY

James H. Barnes, Wadsworth, Ohio, assignor to Edward L. Wood, Detroit, and Charles B. Aske, Jr., Birmingham, Mich.

Filed Jan. 31, 1957, Ser. No. 637,435

2 Claims. (Cl. 24—81)

This invention particularly relates to positioning means for pneumatic tire trim members, while it also relates to the assembly of the trim member on a pneumatic tire and wheel and to the novel clip means used in this trim member assembly.

The present invention is a continuation-in-part of my prior application Serial No. 586,558 filed May 22, 1956.

The present invention relates generally to the type of trim members shown in my prior United States Letters Patent No. 2,737,422, but it particularly relates to a novel clip means for securing a trim member and associated means on the side of a tire and wheel assembly without any disassembly or change of the tire on the wheel member.

The general object of the present invention is to facilitate the assembly of a resilient sidewall trim member upon a pneumatic tire and wheel assembly.

Another object of the invention is to provide a clip means used for positioning engagement with a resilient trim member to secure it on a tire and wheel unit until final anchor ring means, or equivalent can be engaged therewith.

Another object of the invention is to provide resilient clips having integral spring-like means thereon useful both for temporary engagement with a rim flange and a tire trim member to secure it to a tire and wheel assembly and which clips also have radially inwardly extending spring means thereon for aiding it in engagement with an anchor ring and securing such anchor ring to the clip and trim member assembly.

A further object of the invention is to provide a clip, usually made from metal, which can be pounded or otherwise forced into engagement with a wheel rim flange for removable clamping engagement therewith.

Other objects of the invention are to provide resilient anchoring clips of the general type described and wherein the clips have resiliency in a direction extending axially of the wheel, and to provide clip means which have resiliency in a direction extending radially of the tire and wheel assembly; to provide clip means which have special anchor ribs or seats thereon to aid in positioning a trim member in desired radial relationship therewith; to provide clip means that, in general, can be used for temporary engagement with a resilient trim member to position it on a wheel assembly for temporary mounting purposes; and to provide clip means adaptable for engagement with flanges on any conventional types of wheels or rims.

The foregoing and other objects and advantages of the invention will be made more apparent as the specification proceeds.

For a better understanding of the present invention, reference now should be had to the accompanying drawings which show certain currently preferred embodiments of the principles of the invention, and wherein:

Fig. 1 is an elevation of the tire and wheel assembly having trim means and clip means of the invention associated therewith;

Fig. 2 is an enlarged vertical section taken on line 2—2 of Fig. 1;

Fig. 3 is an enlarged perspective view of the clip or securing means shown in Fig. 2;

Fig. 4 is a fragmentary enlarged side elevation of a modified type of the trim member and securing means therefor of the invention;

Fig. 5 is a fragmentary vertical section taken on line 5—5 of Fig. 4 and with an anchor ring added to the assembly;

Fig. 6 is a vertical fragmentary section, like Fig. 2, only of a modified type of a trim member of the invention and with the anchor ring therefor omitted;

Fig. 7 is yet a further modified fragmentary vertical section, like Fig. 2, showing another style of anchor clip means of the invention and with the anchor ring used in combination therewith being omitted, but with the position of the trim member when having an anchor ring secured thereto being indicated in dotted lines;

Fig. 8 is a fragmentary vertical section, like Fig. 2, of a further modified embodiment of the invention;

Fig. 9 is a perspective view of the specific anchor clip means shown in Fig. 8;

Fig. 10 shows yet a further fragmentary vertical section, like Fig. 2, of another modified embodiment of the invention;

Figs. 11, 12 and 13 are reduced size fragmentary perspective views, with the ends shown in vertical cross section, of trim member means such as can be used in the trim member assembly of the invention; and Fig. 14 is a vertical section of a further type of clip of the invention and its engagement with a rim flange is indicated.

When referring to corresponding parts shown in the drawings and referred to in the specification, corresponding numerals are used to facilitate comparison therebetween.

Generally speaking, the present invention relates to a clip used for securing an anchor ring to a tire and wheel assembly, which clip comprises inner and outer retainer walls of integral construction and with one of the walls terminating in an overhanging upper end section so that a rim flange can be engaged between the overhanging end section and the second portion of the walls, and means are provided on one of the walls for engaging a tire trim member to have such member extend radially outwardly therefrom when the clip engages a wheel or rim flange, and the invention relates to a combination of such clip with a trim member and an anchor ring means used for securing the trim member permanently to the clips when engaged with the wheel flange.

In the present invention, the words "wheel" and "rim" are used in a broad sense and are meant to cover rims whether made separately from or integral with a wheel construction so that in all events a wheel or rim flange is provided to have a tire bead seat thereagainst, and which flange is engaged by the clip and other securing means of the invention for positioning a tire trim member in association with a pneumatic tire and wheel assembly.

Reference now is made to the details of the structure as shown in Fig. 1 and a conventional pneumatic tire 1 is shown positioned upon a standard wheel 2, which wheel has an integral rim 3 provided thereon and with an edge wheel or rim flange 4 being present at the lateral margin of the rim, as is conventional in such constructions. A trim member assembly of the invention is indicated as a whole by the numeral 5 and it includes a trim member 6 for removable association with the sidewall portion of the tire 1. The trim member 6 is positioned on the lateral margin of the rim 3 by means including a plurality of clips 7 engaged with substantially equally circumferentially spaced portions of the flange 4. An anchor ring 8 of generally elongated C-shape in radial section is also engaged with the clips 7 and the trim member 6 for permanently securing such members in assembled relationship to each other and to the tire 1.

An important novel feature of the present invention relates to the details of the construction of the securing clips 7 used in this assembly 5 of the invention. Such clips 7 have spaced inner retainer walls 9 and outer retaining walls 10 formed as integral units. The outer walls 10 terminate in overhanging upper end sections 11 so that the wheel or rim flange 4 can be engaged between these overhanging end sections 11 and the upper edges of the inner walls 9 of the clips 7. These clips 7 can be hammered, pried, forced, pounded or otherwise engaged with the rim flange and the clips have sufficient resiliency as to aid or permit them to be sprung or forced to and from engagement with the rim flange in the positions shown in the drawings. The clips extend radially inwardly of the wheel or rim on the lateral margin of the flange 4.

Each of the clips 7 has an outwardly protruding or struck flange, means, or member 12 provided by forcing or punching a portion of the outer wall 10 to extend therefrom and be open radially outwardly of the clips 7 when operatively engaged with the wheel or rim flange 4. Thus such carrier flange 12 is adapted to have the radially inner portion of the trim member 6 seated thereon to temporarily position and hold the trim member 6 in engagement with a tire and wheel assembly prior to engaging the anchor ring 8 therewith for permanent association of such members.

Yet another important feature of this clip 7 is that it has a radially inwardly protruding lip or lug 13 extending radially inwardly from the inner end of the clips 7 when operatively positioned, which lip 13 is continuous on the axially outer surface of this clip 7 and normally is formed by striking, punching or forcing an integral section of the metal sheet or strip used in forming the clips 7 from the radially inner portion of the clip. Such lips form particularly resilient locking means for engaging the radially inner edge of the anchor ring 8 and securing such ring to the tire and wheel assembly. This locking lip 13 normally has an exposed edge on the axially inner surface of the clip but with the lip 13 being adapted to be sprung radially outwardly slightly when engaging the inner portion of the anchor ring therewith and with the anchor ring being able to be forced into and out of engagement with the lips 13 on a plurality of the clips, as desired, for asembling or disassembling the assembly 5 on the tire and wheel assembly. The upper ends of the walls 9 may be serrated if necessary to aid in their clamping engagement with a rim flange.

Additional resiliency is provided in the clip 7 by means of a generally U-shape in section portion 14 on the inner wall 9 of the clip. Such section provides some resiliency in a radial direction of the inner wall 9 and facilitates slight movement of the radially outer edge thereof when engaging such clip with the rim flange or springing it therefrom. The portion 14 also adds to the axial resiliency of the clips 7 when on a flange 4, as shown in Fig. 2.

These clips 7 are made from any desired material and usually are made from metal sheet or strip having suitable strength and resiliency for the functions desired in the clips 7. Blocks 50 of plastic or rubber may be positioned between the walls 9 and 10 to maintain them in spaced relation. It will be seen that the trim member 6 may be molded to a shape roughly as indicated in dotted lines in Fig. 2 but with the trim member being moved axially outwardly to the position shown when positioned on a tire and wheel assembly. This aids in providing the desired resilient or hugging attraction of the trim member 6 for the tire sidewall so that a decorative and protective cover is provided thereon. It will be appreciated that such asssembly of the trim member 6 and associated means can be affixed to the tire 1 without deflating it or changing it on the wheel or rim 3 in any manner.

A modified type of an assembly of the invention is shown in Figs. 4 and 5 and in this instance a trim member 6a is shown and it is positioned on a rim flange 4a by a plurality of clips 7a. In this embodiment of the invention, an overhanging top end section 11a is formed on the inner wall of the clip and it is adapted to engage resiliently with the wheel flange in the manner indicated. The end section 11a connects to an arcuate upper edge 51 of the inner wall 9a of the clip and clamps the flange 4a against such edge 51. The clip 7a may or may not have the resilient locking lip equivalent to the lip 13 provided thereon, as desired. In all events, the upper end of the outer wall 10a of this clip is normally spaced axially slightly from the inner wall thereof and is exposed or open for engagement with a slot 15 provided in the lower end of this trim member 6a so that the trim member can be temporarily positioned by engaging the slot 15 with a plurality of the clips 7a when they are secured to the rim flange 4a. Permanent engagement of these members is secured by means of an anchor ring 8a which engages the clips 7a and a slot 52 provided in the surface of the trim member.

The trim member 6a has a slot 52 therein adjacent the flange for engaging the radially outer end of the anchor ring 8a which is turned axially inwardly of the assembly to aid in holding the trim member 6a against any radially outward movement in the assembly shown.

Fig. 6 shows a clip 7b of the invention which has a resilient locking lip 13b provided thereon and with the position of the locking lip 13b being indicated in dotted lines to show how it can be sprung radially outwardly when engaging an anchor ring, like the anchor ring 8, therewith for permanently positioning a trim member 6b on the assembly. This clip 7b has an outer wall 10b which terminates in a radially outwardly extending end which is adapted to be sprung axially outwardly when the clip is operatively positioned on a rim flange 4b or which is so positioned that the trim member can be slid between such inner and outer walls of the clip to be clamped therebetween, and be operatively positioned thereby. Preferably the trim member 6b has a rib 17 provided thereon which seats against the upper edge of this outer wall 10b and prevents radial inward movement of the trim member 6b when it is being initially assembled. An anchor ring 8, like that shown in the other figures of the drawings, would be used for permanent engagement of the trim member to the assembly shown.

Yet another style of a positioning clip 7c is shown in Fig. 7 and in this instance, an inner wall 9c is provided and which is of substantially inverted U-shape in section. Thus the clip 7c, when operatively positioned, has resilience in an axial direction, while it also has appreciable inherent resilience so that it can be readily forced or sprung over into engagement with a rim flange 4c, as shown. The outer wall 10c of this clip preferably has a recess or groove 18 extending transversely thereof, which groove 18 is adapted to receive a rib 19 provided on a trim member 6c. The clip likewise has a carrier flange 12c provided thereon so that the radially inner edge of the trim member 6c can be positioned on the clip 7c for temporary positioning of the trim. The drawing clearly shows in dotted lines that the portion of the trim member 6c immediately radially beyond the rim flange 4c will be moved axially inwardly of the tire and wheel assembly when an anchor ring, when like the anchor ring 8, is operatively engaged therewith. Such ring will clamp or force the trim member inwardly of the tire and wheel assembly, and it may have equivalent action with the other trim member embodiments of the invention.

Fig. 8 shows yet a further modified type of a clip 7d wherein, in this instance, the inner wall 9d is of generally inverted U-shape in section but with a portion thereof being of arcuate contour as indicated at 20. This contour at 20 prevents the inner end of such wall from cutting into or scratching the rim flange 4d in any manner and gives additional axial resiliency to the assembled clip. It should be noted that the clip 7d has a groove 21 formed therein in its outer wall and with such groove being adapted to contact the inner wall 9d and prevent these walls from collapsing against each other over their entire length and maintains the clips of the general contour and shape shown.

Fig. 10 shows a modified type of a trim member 6e wherein an axially inwardly extending rib 22 is provided. This rib 22 is adapted to engage with the radially outer surface of the flange 4e provided on this rim or wheel of the assembly of the invention, and it strengthens the trim member at a slot 23 in the outer wall of the trim member. The slot 23 receives a flange on the anchor ring and helps retain the assembly together.

It should be realized that the trim members of the invention can be made of any desired shape and that they can be made from any suitable material including rubber and rubber-like materials and other plastic materials having rubber-like properties and being of an inherently resilient and flexible nature. The trim members are molded to desired shapes and sizes to aid in effective operative positioning of the trim members.

Figs. 11 through 13 indicate trim members of the invention of the shapes to which such trim members can be initially molded. When operatively positioned, these trim members are flattened, or even have a reverse curvature put therein and this aids in obtaining inherent forces in the trim members to retain them snugly against a tire sidewall. A trim member 24 is shown in Fig. 11 and it has a groove 24a therein so that normally the radially outer edge of an anchor ring or the like would engage with such groove 24a to aid in holding the trim member firmly in position on a tire and wheel assembly. A trim member 25 is shown in Fig. 12 and it has a rib 26 on the inner surface thereof and a recess 27 on the axially outer surface thereof aligned with such rib 26. Such rib 26 can be used for engaging the radially inner or outer surface of a wheel flange, like the rib shown in Fig. 8, as determined by the positioning of the rib 26 radially of the trim means. The rib 26 strengthens the trim member 25 at the weakened zone formed therein by the recess 27. A rib 28 is provided on the outer face of the trim 25. Such rib 28 bears on the inner surface of the anchor ring used for positioning the trim member and aids in turning in or holding the radially inner section of the trim member tightly against a wheel flange. The ribs 17 of Fig. 6 and the similar ribs on the trim members in Figs. 7 and 8 would function in an equivalent manner.

The locking lip 13 can be provided, or not as desired, on any of the clips of the invention.

A trim member 29 shown in Fig. 13 has a pair of ribs 30 and 31 at concentric, but radially spaced, portions thereof for engaging with both the radially inner and outer surfaces of the wheel flange as indicated in Fig. 10. These trim members can have any desired ribs or grooves on the axially outer faces thereof and preferably has a groove 32 and ribs 33 and 34. Thus an anchor ring can engage with either the radially outer edge of the rib 33 or seat in groove 32 to aid in positioning a trim member against any radial movement in an assembly of the invention. The rib 34 aids in holding the trim against a wheel flange by engaging the inner wall of an associated anchor ring.

It will be seen that the clip 7e shown in Fig. 10 also has an axially outwardly extending section or portion 50a extending across the axially inner wall thereof. This section 50a normally will contact the outer walls of the clips spaced apart from each other even when being forced into engagement with a wheel flange.

Yet a further modified clip of the invention is shown in Fig. 14. Such clip 7f has an overhanging top flange 11f at the end upper edge thereof which is adapted to engage with the rim flange as in the manner of the other clips. However, only one wall is provided in this clip and it terminates in an axially inwardly bent lower end portion 51a that normally will abut against or seat on the laterally outer portion of the rim flange. An anchor ring, like those shown in the other embodiments of the invention, can be engaged with such clip 7f to permanently secure a trim member thereto.

Any of the clip means of the invention may have the locking or positioning flanges like the flange 12 provided thereon, or they may have resilient lips like the lip 13 thereon to aid in engaging an anchor ring therewith and permitting the ready release and/or engagement thereof.

The clips 7c, 7d and 7e are especially good, it is thought, in their action in being forced onto or off wheel flanges. By making these clips from an integral piece of sheet or strip metal, the U-shaped inner walls and the outer wall combine to provide two folded metal zones for flexure of the clips. Such clips all have good axial resiliency but yet will not let the inner and outer walls collapse against each other. The axial resiliency helps in springing an anchor ring into and out of engagement with a clip.

The rib 22, or equivalent, may be added to the trim member of Fig. 8 as it will aid in retaining the trim member against radially inward or outward movement by the trim member having concentric ribs thereon, as in the trim member 29, for engaging radially inner and outer surfaces of a wheel flange.

It will be realized that the means provided herein facilitate the positioning of a trim member on a wheel assembly prior to engagement of an anchor ring therewith. Hence, the invention greatly simplifies the overall assembly of the trim member means of the invention on a pneumatic tire assembly as the trim members can be temporarily positioned on the wheels by use of the clips 7 and associated positioning or carrier flanges or equivalent means provided thereon. Thereafter, the final securing means such as the anchor rings can be engaged therewith for permanently mounting the trim members in desired positions. Hence it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. A clip for use in securing an anchor ring to a tire rim, which clip comprises an inner retainer wall having a top edge, an integral outer wall terminating in an overhanging upper end section whereby a rim flange can be engaged by said overhanging section and the top edge of said retainer wall, a carrier member formed from a portion of said outer wall and protruding therefrom to engage a trim member and position it on the clip when a plurality of clips are operatively secured to a rim flange, and a resilient radially inwardly extending lip formed at the radially inner portion of said clip.

2. A clip for use in securing an anchor ring to a tire rim, which clip comprises an inner retainer wall and an integral outer wall terminating in an overhanging upper end section whereby a rim flange can be engaged by said overhanging section and said retainer wall, said outer wall having a locking lug extending from a radially inner part thereof to provide a depressible section for primary engagement with an anchor ring to be secured to a tire rim thereby, said outer wall having a protruding carrier flange thereon adapted to engage a radially inner portion of a trim member for temporarily engaging and positioning such trim member.

References Cited in the file of this patent

UNITED STATES PATENTS

| | | |
|---|---|---|
| 2,329,854 | Rubsam | Sept. 21, 1943 |
| 2,455,151 | Wood | Nov. 30, 1948 |
| 2,749,185 | Wood | June 5, 1956 |

FOREIGN PATENTS

| | | |
|---|---|---|
| 511,056 | Great Britain | Aug. 14, 1939 |
| 1,061,278 | France | Nov. 25, 1953 |